June 29, 1954 D. W. HARLING 2,682,640

ARRANGEMENT FOR MODULATING ELECTRIC CARRIER WAVE OSCILLATIONS

Filed Aug. 23, 1952

2 Sheets-Sheet 1

INVENTOR
Denis William Harling
BY
ATTORNEY

June 29, 1954 D. W. HARLING 2,682,640

ARRANGEMENT FOR MODULATING ELECTRIC CARRIER WAVE OSCILLATIONS

Filed Aug. 23, 1952 2 Sheets-Sheet 2

INVENTOR
Denis William Harling
BY

Patented June 29, 1954

2,682,640

UNITED STATES PATENT OFFICE 2,682,640

ARRANGEMENT FOR MODULATING ELECTRIC CARRIER WAVE OSCILLATIONS

Denis William Harling, North Wembley, England, assignor to The General Electric Company Limited, London, England, a British company Application August 23, 1952, Serial No. 306,001

Claims priority, application Great Britain August 28, 1951

9 Claims. (Cl. 332—47)

Figure 1:
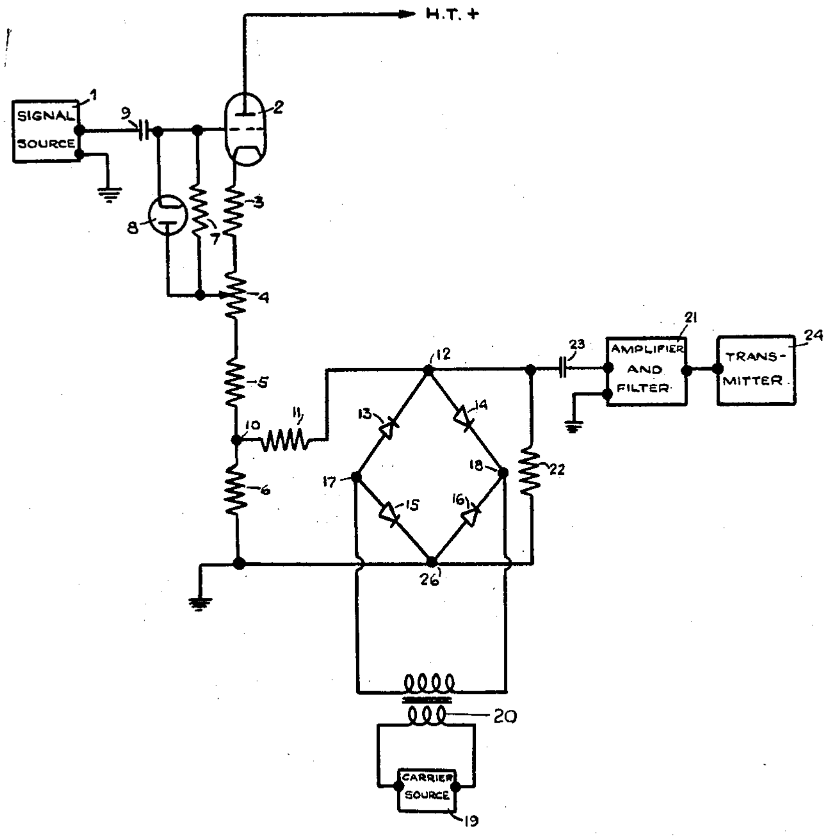

The present invention relates to arrangements for modulating electric carrier wave oscillations.

When a carrier wave oscillation of frequency $fo$ is modulated by a signal voltage of frequency $fs$ there is produced, in general, a complex oscillation having as components oscillations of frequency $fo$, $fo \pm fs$, $fo \pm 2fs$ etc. Thus there are produced a component oscillation of the carrier wave frequency, and two frequency bands of component oscillations lying one above and one below the frequency of the carrier wave. These two frequency bands of oscillations are known as sideband oscillations.

Where the signal voltage frequency $fs$ itself covers a relatively wide band, as for example in the case of television signals, it is known in order to reduce the bandwidth of a transmitted signal, to transmit only one sideband together with a vestigial part of the other. This practice however gives rise to certain distortion effects, notably quadrature distortion, which it is found can be substantially reduced, if not eliminated, by transmitting as a component of the signal an oscillation of the carrier wave frequency in the correct phase but having an amplitude greater than the component of that frequency present in a case where the modulation ratio is unity. The normal practice is to generate an oscillation including as components both side bands of the modulated carrier wave oscillation and an oscillation of carrier wave frequency of the desired amplitude (this would normally result from modulating a carrier wave frequency oscillation by the signal, the modulation ratio being less than unity), and to use a filter to eliminate the major part of the side band of which only a vestigial part is to be transmitted.

Where stable operation over long periods of time combined with simplicity is required, a particularly convenient form of modulator is that sometimes known as a bridge or a Cowan modulator, in which four like asymmetrically conducting devices, for example rectifier elements such as germanium crystal rectifiers, are connected one in each arm of a bridge circuit. The polarity of the devices is arranged so that at one pair of opposite corners of the bridge like terminals are connected together, whilst at the other pair of opposite corners unlike terminals are connected together. Modulating signals are coupled across the said other pair of opposite corners of the bridge by an input transformer, whilst an output from a carrier wave frequency oscillator is coupled across the said one pair of corners of the bridge, usually by a transformer. An output circuit is coupled across the other pair of corners of the bridge.

This form of modulator is however essentially a balanced device and produces an output oscillation in which the carrier wave frequency component is suppressed completely. One known arrangement for producing the desired form of modulated carrier wave oscillation using a balanced modulator, includes an additional stage in which a component oscillation of the carrier wave frequency is injected in the correct phase and with the required amplitude. This is unsatisfactory in that it necessitates the inclusion of additional stages, and very careful control of the phase and amplitude of the carrier wave frequency oscillation injected is necessary. This latter factor makes stable operation difficult to achieve.

It is also known to produce the desired form of modulated carrier oscillation from any type of balanced modulator, by introducing the necessary degree of unbalance in the balanced elements. Thus in a balanced modulator employing a pair of pentode thermionic valves, the latter might be operated with different screen grid voltages. In a bridge modulator unbalance could be introduced by applying separate biases to the elements employed. These arrangements however have the disadvantage that the operation then depends critically on the individual characteristics of the elements, great care therefore having to be taken to match the elements in the first place and to replace any element which fails by one having the same characteristics. Where stable operation over a long period without need for readjustment is required, this is obviously inconvenient.

It is an object of the present invention to provide a simple arrangement utilising a bridge modulator for modulating the amplitude of an electric carrier wave oscillation to produce an oscillation including as components both side bands together with an oscillation of the carrier wave frequency having a predetermined amplitude, and in particular to provide such an arrangement which operates with a high degree of stability.

According to the present nivention an arrangement for modulating the amplitude of an electric carrier wave oscillation comprises a cathode follower stage having a pair of input terminals across which, in operation, modulating signal voltages are applied and a pair of output terminals connected across points in the cathode load across which, in operation, a predetermined direct current voltage appears in addition to signal voltages; a bridge modulator circuit comprising four equal arms each containing a rectifier, the rectifiers being arranged so that like poles of one kind are connected to one of one pair of opposite corners of the bridge and like poles of the other kind are connected to the other of the said one pair of opposite corners; a carrier wave oscillation generator coupled across the said one pair of opposite corners of the bridge; and means for electrically connecting the other pair of opposite corners of the bridge in circuit either in parallel or in series with an output circuit across the said pair of output terminals of the cathode follower stage.

A source of a predetermined direct current voltage may be connected in series with the said other pair of opposite corners of the bridge, whereby the standing voltage applied across the said other pair of opposite corners of the bridge in operation is determined both by the voltage of the source and standing direct current voltage across the output terminals of the cathode follower stage.

In either case, the standing direct current voltage across the other pair of opposite corners of the bridge is predetermined, having regard to the characteristics of the bridge modulator to give the required level of carrier wave frequency oscillations in the output from the arrangement.

Preferably the standing direct current voltage across the other pair of opposite corners of the bridge may be adjusted by providing an adjustment whereby the voltage of said direct current source may be varied. Where the said source is not included, means may be provided for varying the control grid bias of the thermionic valve in the cathode follower stage to provide an adjustment of the standing current in the cathode load and therefore of the magnitude of the direct current potential across the output terminals of the stage.

The said source of direct current includes a resistor and means for passing a predetermined direct current through the resistor. The resistor may be connected as part at least of the cathode load of a thermionic valve connected as a cathode follower stage but having a fixed control grid potential.

Each rectifier of the bridge modulator may comprise one or more rectifier elements of any type suitable for the frequencies of operation involved, connected in series or parallel, provided that the elements have low reactive components of impedance. Each rectifier element may be a germanium crystal.

Figure 2:
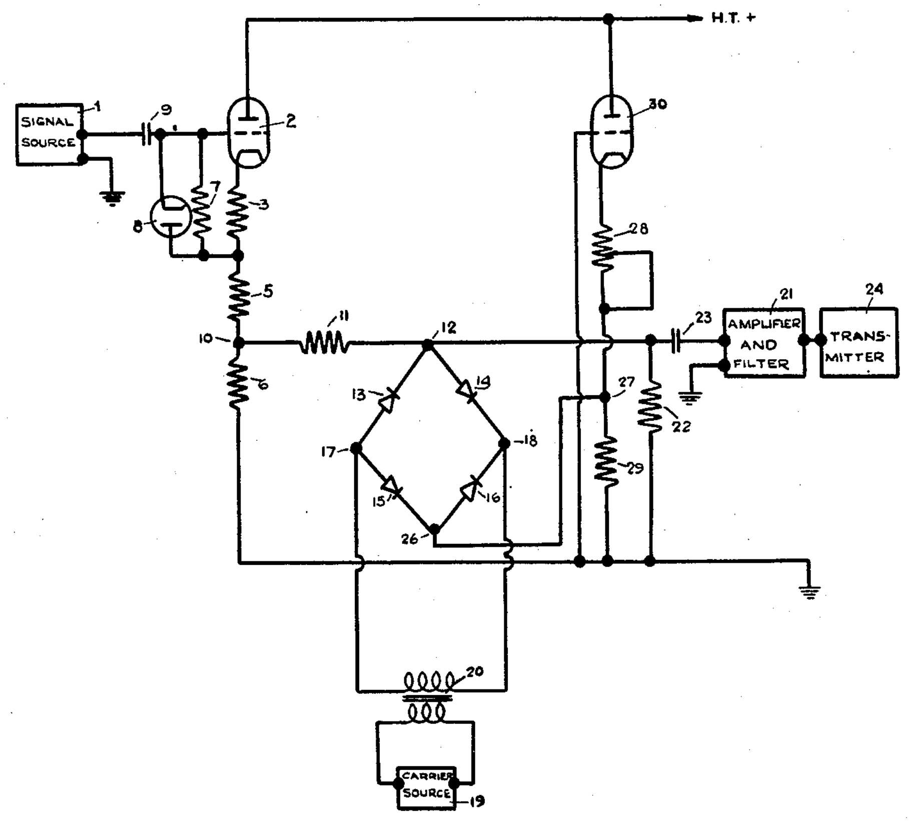

Two arrangements in accordance with the present invention will now be described by way of example with reference to the accompanying drawings, in which Figure 1 shows a circuit diagram of the first arrangement, and Figure 2 shows a circuit diagram of the second arrangement.

Referring now to Figure 1 of the accompanying drawings, the signal voltages which are to be applied to modulate the amplitude of the carrier wave oscillations, are derived from a television signal source 1, which is represented as a block in Figure 1. The output from the signal source 1 is applied to the input of a conventional cathode follower stage including a thermionic valve 2, which is shown as a triode in Figure 1 but may be any other suitable type of valve. The anode of the valve 2 is connected directly to the positive H. T. voltage supply, and a chain of resistors 3—6 is connected in series between the cathode and earth. A grid leak resistor 7 is connected between the control grid of the valve 2 and a variable tapping on the resistor 4, adjustment of which varies the standing cathode current flowing in the resistors 3—6 in the absence of signals applied to the control grid. If required the direct current level of the signals applied to the control grid of the valve 2 may be set in known manner for example by connecting a diode 8 in parallel with the resistor 7, the diode 8 as shown in Figure 1 being arranged on the assumption that the signals from the source 1 are positive going television signals, that is signals in which the datum level during the synchronising pulses is a minimum. A coupling capacitor 9 is connected between one side of the output of the source 1 and the control grid of the valve 2.

The output from the cathode follower stage is taken from across the terminal 10, that is the common terminals of resistors 5 and 6, and earth, the voltage at the terminal 10 varying, when signals are applied from the source 1, from the fixed value set by the adjustment of the tapping on the resistor 4. In the case mentioned previously in which the signals from the source 1 are positive going, the signals will cause the potential at the terminal 10 to increase from the fixed value whilst in the other case of negative going signals they will cause the voltage at the terminal 10 to decrease from the fixed value.

A bridge modulator of the type sometimes known as a "Cowan" modulator is connected across the terminal 10 and earth, a resistor 11 being connected between one corner terminal 12 of the bridge and the terminal 10. The resistor 11 is included to increase the output impedance of the cathode follower stage to the bridge modulator, to a value required for efficient operation of the latter. The bridge includes four rectifier devices 13–16, which are preferably germanium crystal rectifiers as these have low reactive components of impedance, connected one in each arm of the bridge, their polarities being arranged as shown in Figure 1 so that two like poles of one kind are connected to the corner terminal 17 and two like poles of the other kind to the corner terminal 18. A source of carrier frequency oscillations 19 is coupled across the terminals 17 and 18 by a transformer 20. The output from across the terminal 12 and earth is coupled to an amplifier and filter 21 in cascade by the coupling circuit comprising the resistor 22 and the capacitor 23. The filter included in the amplifier and filter 21 is a band pass filter arranged to pass the band of frequencies covering one sideband and a vestigial part of the other sideband of the carrier frequency oscillations from the source 19 amplitude modulated by the signals from the source 1, which are applied to it in operation. The output from the amplifier and filter 21 is applied to a transmitter 24 for passing the modulated carrier oscillation to a transmission medium. The transmitter 24 may include for example one or more power amplifier stages, the output from which is coupled to a transmitting antenna or a high frequency cable.

The bridge modulator operates as follows. Assuming for the moment that no voltage is applied across the terminal 12 and earth, the bridge is balanced, assuming the rectifier devices 13–16 to be identical, and therefore no oscillation of carrier frequency appears across the terminal 12 and earth. If however a suitable steady positive voltage is applied to terminal 12, for example that due to the standing voltage at the terminal 10, the rectifier devices 14 and 15 become conducting and the bridge is unbalanced. Under these circumstances a carrier frequency oscillation appears across the terminal 12 and earth and is coupled to the amplifier and filter 21 and thence to the transmitter 24. The amplitude of the oscillation will depend on the degree of unbalance of the bridge, and if the rectifier devices are worked on the non-linear part of their conducting characteristics, the degree of unbalance will vary with the magnitude of the voltage applied to the terminal 12. Thus if a varying voltage is applied to the terminal 12, the oscillations appearing across the terminal 12 and earth will be modulated in amplitude in dependence upon those variations.

In the arrangement shown in Figure 1, a standing voltage is applied to the terminal 12, on which is superimposed a varying signal voltage derived from the source 1. The output from the modulator applied to the amplifier and filter 21 is therefore a carrier frequency oscillation modulated in amplitude by the signals from the source 1. By suitably setting the standing voltage at the terminal 10, having regard to the characteristics of the bridge modulator, the unmodulated carrier level can be set so that the output from the modulator includes a component of carrier wave frequency of some predetermined amplitude in addition to both sidebands. This component will automatically be in the correct phase. The output from the filter will then be an oscillation consisting of one sideband and a vestigial part of the other sideband of the modulated oscillations together with a component of the carrier wave frequency.

The arrangement described with reference to Figure 1 has the disadvantage that it is not possible to adjust the level of the carrier wave frequency components relative to that of the sideband to any great extent. This arises for the reason that any appreciable adjustment of the standing bias on the bridge modulator, cannot be carried out without affecting the operating conditions of the valve 2, and is likely to vary the anode slope resistance in such a manner that the amplitude of the signal voltages at the terminal 10 varies with the direct current voltage. In this way any attempt to adjust the modulation ratio of the output is largely nullified. This is undesirable since alterations in the operating conditions, i. e. the changing or ageing of the valve, variations in the ambient temperature etc., may necessitate the provision of a control for maintaining the modulation ratio constant by adjlstments from time to time as required. This disadvantage is overcome in the arrangement shown in Figure 2 of the drawings. The elements which are identical in Figure 1 and Figure 2 are given the same references in the two figures.

Referring now to Figure 2, the circuit of the cathode follower stage is the same as that described with reference to Figure 1, except that the resistor 4 is omitted, and the grid leak resistor 7 is connected to the common terminals of the resistors 3 and 5.

The bridge modulator and the carrier source 19 are also connected as before, except that the corner terminal 26 of the bridge, which is earthed in the arrangement shown in Figure 1, is connected to the common terminal 27 of a pair of resistors 28 and 29 connected in series between the cathode of a valve 30 and earth. The valve 30 is preferably of the same type as the valve 2, its anode being connected directly to the positive H. T. voltage supply and the control grid being earthed. The resistor 28 is made variable to permit adjustment of the circuit operation.

In this arrangement the standing voltage at the terminal 10 is predetermined by the characteristics of the valve 2 and the values of the resistors 3, 5 and 6. However the standing voltage across the bridge terminals 12 and 26 is determined now also by the voltage at the terminal 27. This is controlled by the setting of the resistor 28, which therefore provides an adjustment of the standing bias on the bridge modulator.

The terminal 26 could be connected simply to a point on a purely resistive potentiometer chain connected between the positive H. T. voltage line and earth, but the arrangement described above is preferred, particularly where stability of operation is required, since the symmetrical arrangement of the valves 2 and 30 reduces the effect of variations in the operating conditions, such as temperature and voltage supplies.

In either of the arrangements described with reference to Figures 1 and 2, the bridge modulator may as an alternative be connected in series relationship with the output instead of the parallel relation as shown. In this case in the arrangement of Figure 1 the terminal 12 would be connected only to the resistor 11, and not to the common terminal of the resistor 22 and the capacitor 23. In addition the terminal 26 would be disconnected from earth and connected to the common terminal of the resistor 22 and capacitor 23. Whilst in the arrangement of Figure 2, terminal 12 would be reconnected as with the arrangement of Figure 1, terminal 26 would be connected to the common terminals of the resistor 22 and the capacitor 23 and disconnected from terminal 27, and the earthed end of the resistor 22 would be connected to terminal 27 and not to earth.

The television signals applied from the source 1 may as stated above be either positive or negative going, that is they may have a minimum or maximum datum amplitude respectively during the synchronising pulses. In the first case the amplitude of the modulated oscillations produced by the arrangement is a minimum at the datum signal amplitude, and in the second case a maximum at the datum amplitude. It will be appreciated that whilst the arrangements are particularly suitable for the application of a television signal to modulate the amplitude of the carrier oscillations, they may equally be used for other types of signal, the signal source 1 being changed accordingly.

As stated above, where a component of carrier wave frequency is transmitted with one or both of the side bands of the modulated carrier oscillations, it is important that the phase of the carrier frequency oscillations should be correct with respect to that of the side band oscillations, since any error produces distortion on demodulation of the oscillations again. In the first of the previously known arrangements discussed above, it is necessary to include means for ensuring the correct phase relationship, thus adding to the complexity of the arrangement. In an arrangement in accordance with the present invention the phase relationship is inherently correct, except for any leakage due to unbalance of the bridge modulator. Provided the rectifiers have low reactive components of impedance, as is usually the case with germanium crystal rectifiers, any unbalance will be almost entirely resistive and will result in leakage either in phase or in anti-phase with the desired component of carrier wave frequency. The leakage will therefore merely add or subtract from the component of carrier wave frequency without affecting the phase. Accurate balance of the rectifiers used in the bridge is therefore unnecessary provided they are selected to have low reactive components of impedance.

The arrangements in accordance with the present invention are simple and the method of adjusting the amplitude of the component of carrier wave frequency is straight forward, except for the disadvantage already mentioned in the case of the arrangement shown in Figure 1. A further advantage of the arrangement is that only one or two thermionic valves are employed, of which the one employed in passing the signals is included in a cathode follower stage, which in operation will have a considerable degree of cathode feedback and therefore considerable stability.

I claim:

1. An arrangement for modulating the amplitude of an electric carrier wave oscillation comprising a cathode follower stage having a pair of input terminals across which modulating signal voltages are applied and a pair of output terminals connected across points in the cathode load across which a predetermined direct current voltage appears in addition to signal voltages; a bridge modulator circuit comprising four equal arms each containing a rectifier, the rectifiers being arranged so that like poles are connected together at each of one pair of opposite corners of the bridge and unlike poles are connected together at each of the other pair of opposite corners; a carrier wave oscillation generator an output from which is applied across the said one pair of opposite corners of the bridge; an output circuit; and means connecting the bridge modulator, by the other pair of opposite corners, in circuit with the output circuit across the output terminals of the cathode follower stage.

2. An arrangement according to claim 1 comprising a source of predetermined direct current voltage and means connecting said source in series with the said other pair of opposite corners of the bridge.

3. An arrangement according to claim 1 comprising a source of predetermined direct current voltage, means for adjusting the magnitude of said predetermined voltage and means connecting said source in series with the said other pair of opposite corners of the bridge.

4. An arrangement according to claim 1 comprising a resistor, means connecting said resistor in series with the said other pair of opposite corners of the bridge, and means for passing a predetermined direct current through the resistor.

5. An arrangement according to claim 4 in which said means for passing a predetermined direct current through the resistor comprises a thermionic valve connected in a cathode follower circuit and having a fixed control grid voltage, and means connecting said resistor as part at least of the cathode load of said valve.

6. An arrangement according to claim 5 in which the magnitude of the cathode load may be adjusted to vary the current flowing in the resistor.

7. An arrangement according to claim 1 in which the output circuit includes a band-pass filter, and means for applying the amplitude modulated oscillations to the input of the filter, the filter having a pass band covering one sideband and a vestigial part of the other sideband of the amplitude modulated oscillations applied to it in operation.

8. An arrangement according to claim 1 in which each rectifier is a germanium crystal rectifier.

9. An arrangement according to claim 1 in which the input circuit of the cathode follower stage includes means for clamping the direct current level of the signals applied to it to a datum level.

References Cited in the file of this patent

UNITED STATES PATENTS

| Number | Name | Date |
|---|---|---|
| 2,510,075 | Clavier et al. | June 6, 1950 |